Oct. 21, 1958   H. W. TREVASKIS   2,856,945
DEMAND VALVE FOR RESPIRATORY APPARATUS
Filed Oct. 19, 1954   3 Sheets-Sheet 1

INVENTOR
Henry William Trevaskis
by Benj. T. Rauber
his attorney

Oct. 21, 1958   H. W. TREVASKIS   2,856,945
DEMAND VALVE FOR RESPIRATORY APPARATUS
Filed Oct. 19, 1954   3 Sheets-Sheet 2

INVENTOR
Henry William Trevaskis
by Benj. T. Rauber
his attorney

United States Patent Office 2,856,945
Patented Oct. 21, 1958

2,856,945

DEMAND VALVE FOR RESPIRATORY APPARATUS

Henry William Trevaskis, Solihull, England, assignor to Dunlop Rubber Company Limited, London County, England, a British company Application October 19, 1954, Serial No. 463,233

Claims priority, application Great Britain October 20, 1953

2 Claims. (Cl. 137—63)

This invention relates to demand valves for respiratory apparatus and more particularly relates to divers' demand valves.

When a diver, equipped with only a light respiratory equipment comprising a mouthpiece and a bottle of compressed air or oxygen, is submerged, a valve should preferably be provided to meter out air or oxygen in accordance with the diver's individual requirements and to adjust the pressure of the air or oxygen in accordance with the depth at which the diver is working. Such a valve is known as a demand valve.

My invention provides an improved valve of this nature.

In my invention the demand valve comprises a low pressure chamber to be connected to an operator's breathing mask or the like, a high pressure chamber to be connected to a gas under pressure, a normally closed inlet valve to allow the flow of gas from said high pressure chamber to said low pressure chamber, a displaceable member associated with said low pressure chamber and responsive to variations in external pressure, and means operated by movement of the displaceable member to open the inlet valve on relative increase of external pressure and to allow it to close on relative decrease of said pressure.

The change in the relation between internal and external pressure may be due to aspiration of the user of the valve or to a change in the depth of water when it is used by a diver.

Preferably the inlet valve is balanced, i. e. when the valve is closed the gas pressure tending to open the valve is counterbalanced by the gas pressure tending to close the valve. The valve is normally lightly spring-loaded into a closed position and a very light force only is required to open the valve. Preferably one at least of the walls of the low pressure chamber comprises a member displaceable inwardly by a reduction in pressure in said chamber caused by aspiration of the diver and this movement, acting through a system of levers and the like, opens the inlet valve against the valve return spring.

The invention will now be described with reference to the accompanying drawings of which Figure 1 is a sectional view of a demand valve constructed according to one embodiment of the invention.

Figure 2:
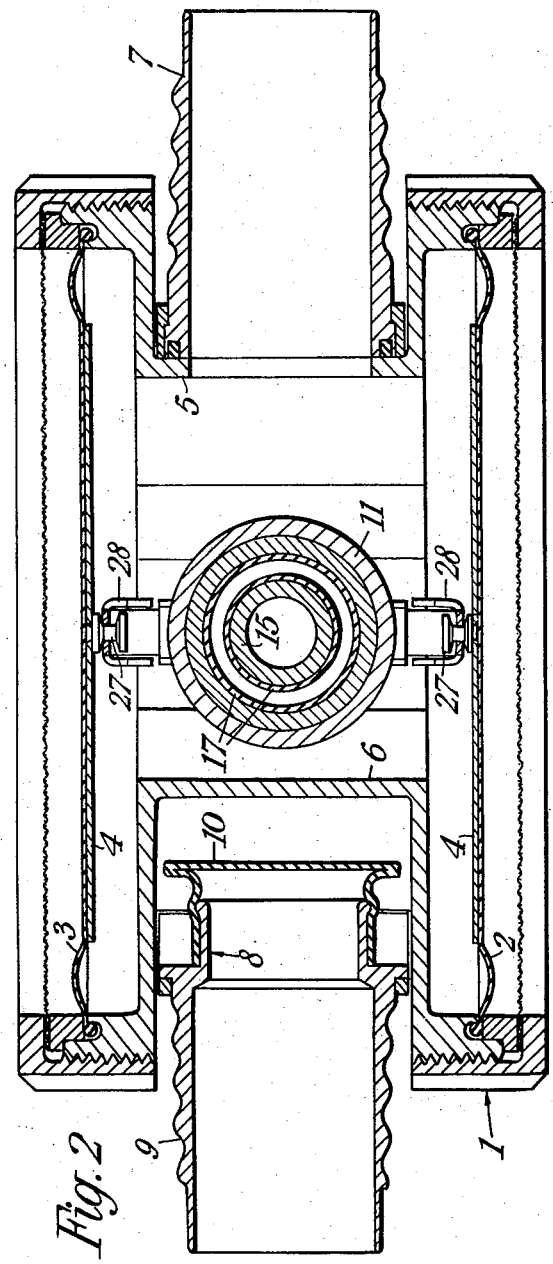
Figure 2 is a sectional view of the demand valve of Figure 1 taken on the line A—A of that figure and looking in the direction of the arrows.

In this embodiment of the invention a demand valve for a diver's respiratory apparatus comprises a substantially cylindrical housing 1, the two end walls 2, 3 of which comprise flexible diaphragms, the outer periphery of each being fluid-tightly secured to the housing. A flat disc 4 is secured to the centre of each diaphragm, on the inner side thereof, and the housing 1 is provided with means for connecting the interior thereof, which comprises a low pressure chamber, to a diver's mouthpiece. The periphery of the housing 1 is recessed midway between its ends 2, 3, to provide diametrically-opposed flat or plane walls 5, 6, Fig. 2, to one of which, i. e. 5, an outlet nozzle 7, for connection by flexible pipe to the diver's mouthpiece, is secured. To the wall 6 of the opposite recess an exhaust valve 8 is secured. This valve 8 comprises a tubular member 9 the outer end of which can be secured by flexible pipe to the diver's mouthpiece whilst the inner end has secured thereto a mushroom-shaped flexible rubber member 10, said member 10 being provided with vents (not shown) adjacent its outer periphery. Thus as the diver aspirates he draws air from the low pressure chamber and at the same time causes a suction in the exhaust valve 8 which closes the vents in the rubber member. On expiration the stale air passes through the vents into the water.

A tubular member 11, comprising a high pressure chamber, is fluid-tightly secured to the housing 1 and extends diametrically across the low pressure chamber, between the two flats 5, 6, from one side to a location adjacent the other side, and has an inlet nozzle 12 for connection to a source of pressure, e. g. an air bottle. An inlet valve seat member 13 is secured to the side of the low pressure chamber diametrically opposite the tubular member and is provided with an annular valve seat 14 of rubber or rubber-like material.

A tubular valve 15 is fitted within said tubular member 11, one end 16 being chamfered to an annular knife-edge at the outer periphery thereof to co-operate with the inlet valve seat 14. An inturned rubber stocking 17 is fitted betwen the other end of the tubing valve 15 and the said tubular member 11. The outer chamfered edge 16 of the tubular member 15 is in alignment with the middle or mid circle of the inturned tubing 17 so that the area on which the pressure acts at opposite ends of the tubular member 15 are virtually equal inasmuch as one-half of the pressure on the tubing 17 will be borne by the tubular member 15, the other being supported by the wall of the passage 11. The arrangement of parts is such that the tubular valve 15 is balanced when the high pressure chamber is pressurized, and a very light force only is required to move it in either direction. The inlet valve is normally kept closed by a light helical spring 18 interposed between an abutment 19 on the tubular valve 15 and another abutment 20 on the inlet nozzle 12 secured to the tubular member 11.

Figure 1:
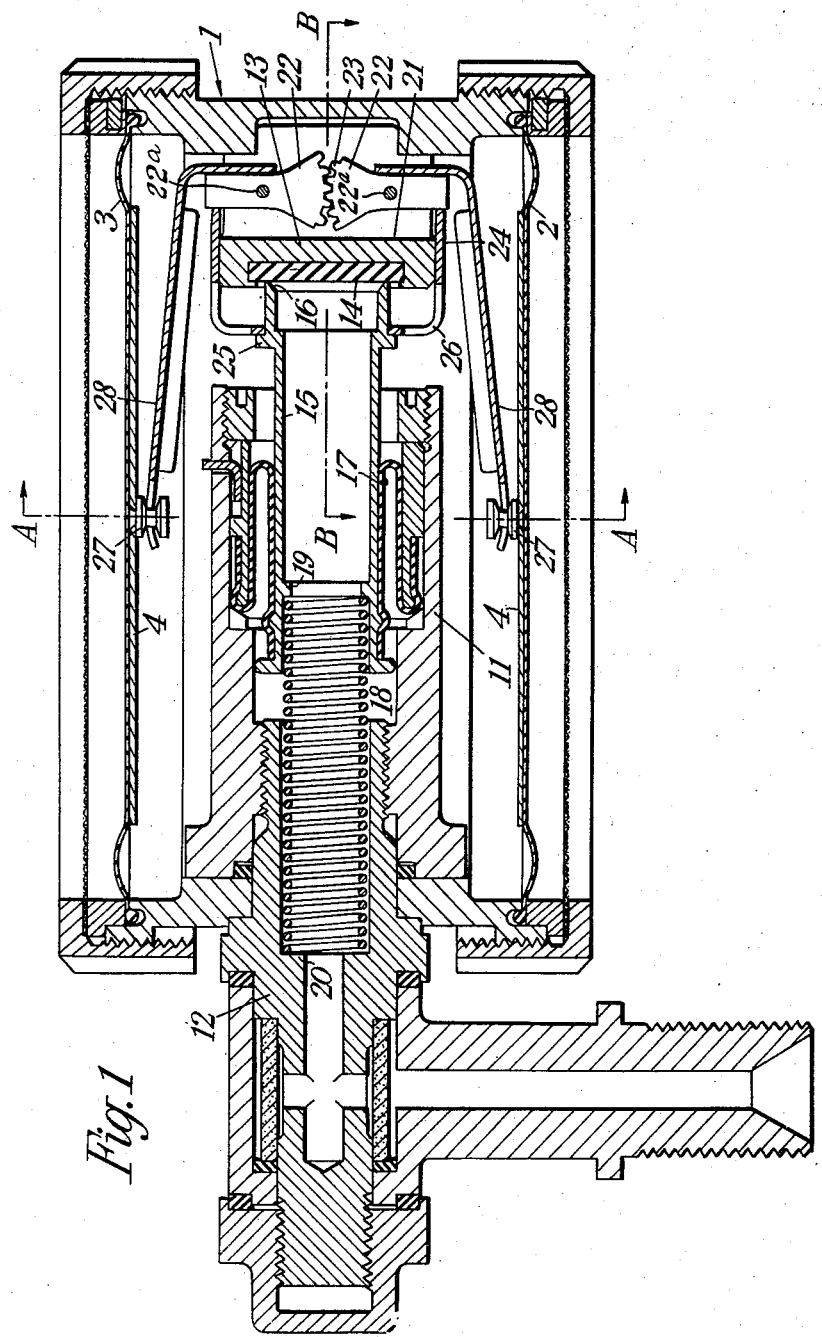
Figure 3:
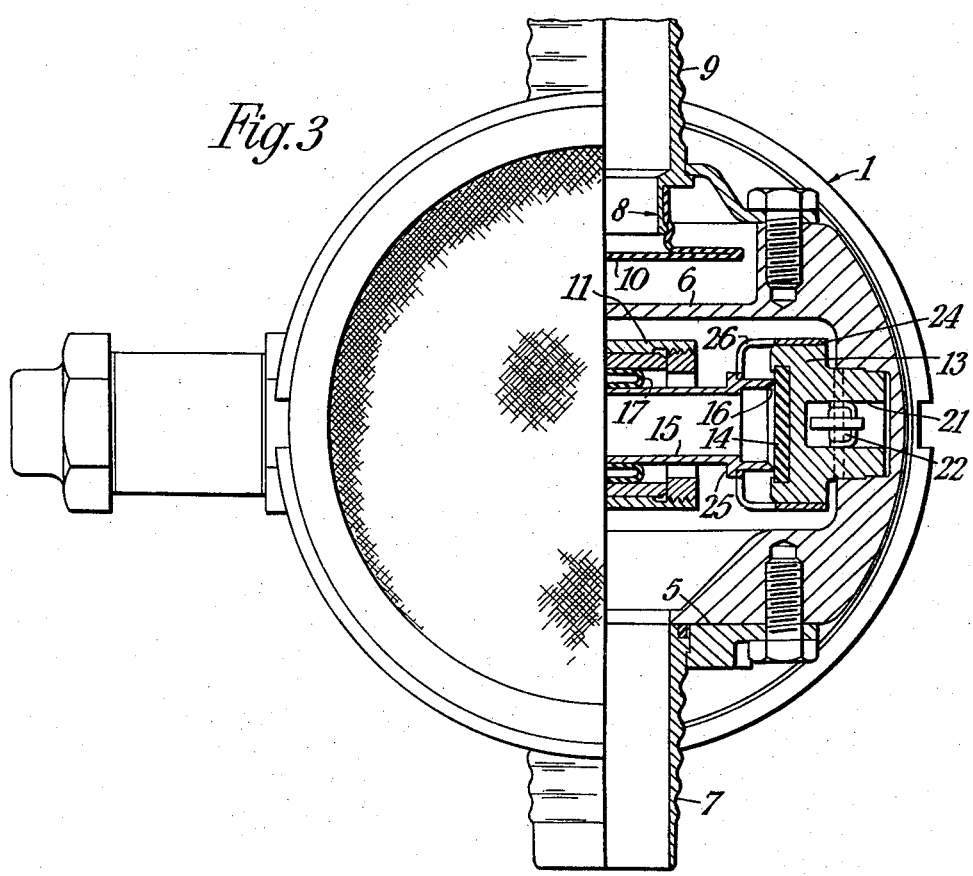
Figure 3 is a further sectional view of the demand valve of Figures 1 and 2 taken on the line B—B of Figure 1 and looking in the direction of the arrows.

The inlet valve seat member 13 is provided with a diametrically extending slot 21, Figs. 1 and 3, on the side thereof remote from the valve seat 14, the major axis of the slot 21 being parallel to the axis of the housing 1. Two geared members 22, 22 are pivotally secured 22a to said slot 21, their opposite ends projecting exterior of opposite ends of the slot 21 and their adjacent ends being radiused and provided with meshing teeth 23. A cylindrical valve locator 24 is slidably fitted over the valve seat member 13, one end thereof abutting the ends of the two geared members 22, 22 projecting exterior of the slot 21 and the other end being inwardly turned to abut an annular shoulder 25 formed on the adjacent end of the tubular valve 15. The inwardly turned end is provided with slots 26 to permit the passage of pressure fluid therethrough.

Secured centrally to each of the discs 4, which, with the diaphragms 2, 3 form the two ends of the housing, is a grooved stud 27 and the slotted end of a cranked lever 28 is associated with and tilted by each of said studs 27, about pivots 22a of the member 22, the other end of each cranked lever 28 being secured to each of the geared members 22, whereby angular movement of either or both the cranked levers pivots the two meshing geared members 22 to axially move the valve locator 24 and thereby crack the inlet valve.

The pressure in the low pressure chamber should preferably increase with the depth at which the diver is operating. The two diaphragms 2, 3, one on each end of the housing, are exposed on one side to the pressure of the water, which increases with the depth. This pressure forces the diaphragms inwardly of the low pressure chamber and, acting through the disc 4 secured to each diaphragm, the cranked levers 28, geared members 22 and valve locator 24, lifts the inlet valve off its seating sufficiently to pressurize the low pressure chamber to a value equal to the water pressure. The diver's lungs which are, in effect, connected to the low pressure chamber, are pressurized to the same value, thus preventing discomfort to the diver when operating at substantial depths.

As the diver aspirates he reduces the pressure in the low pressure chamber. The two diaphragms 2, 3 are thus forced inwardly by the water pressure. This, acting through the discs 4, cranked levers 28 and geared members 22 moves the valve locator 24 axially, the inwardly-turned end thereof moving the tubular valve 15 against the spring 18 to crack the inlet valve and allow the passage of air from the high pressure chamber into the low pressure chamber, and thence into the diver's lungs, until the increased pressure in the low pressure chamber forces the diaphragms outwardly again, assisted by the valve return spring 18, to close the inlet valve and cut off any further supply from the high pressure chamber. This process is repeated for each breath the diver takes.

Expiration is effected through the exhaust valve 8, hereinabove described, which is located in a recess in the outer periphery of the housing and which is connected to the diver's mouthpiece. The inlet valve remains closed during expiration.

The demand valve of the present invention is very light and sensitive in action. The inlet valve is balanced and, since there is practically no sliding friction of the tubular valve member the valve return spring can be of very light rating. The inlet valve thus opens almost immediately the diver aspirates and remains open until he has filled his lungs with air at the pressure obtaining in the low pressure chamber, which itself is governed by the depth of water in which the diver is operating.

The demand valve may also be used in respiratory apparatus for contaminated atmospheres.

Having now described my invention, what I claim is:

1. A demand valve comprising a low pressure chamber to be connected to an operator's breathing mask or the like, a high pressure chamber to be connected to a gas under pressure, a fixed valve seat in said low pressure chamber, a tubular inlet valve gas-tightly slidable in said high pressure chamber and spring-urged into seating engagement with said valve seat, a displaceable member associated with the low pressure chamber and responsive to relative variations in internal and external pressure, means operated by movement of said displaceable member to open said inlet valve on relative increase of external pressure and to allow it to close on relative decrease of external pressure, a flexible stocking secured to adjacent peripheries of said high pressure chamber and said tubular inlet valve and located in an annular space formed between said peripheries, said inlet valve being stepped to two diameters and the projected area thereof in one axial direction being equal to the projected area of the valve member and part of the flexible stocking in the opposite axial direction whereby the force exerted by the inlet pressure and acting on said areas is equal and the valve member is balanced.

2. A demand valve according to claim 1 wherein the end of the tubular inlet valve member which lies adjacent the said fixed valve seat is formed as a knife-edge at its outer periphery.

References Cited in the file of this patent

UNITED STATES PATENTS

| 1,041,636 | Lamoreaux | Oct. 15, 1912 |
| 2,071,143 | Scott | Feb. 16, 1937 |
| 2,369,170 | Motsinger | Feb. 13, 1945 |
| 2,375,432 | Miller | May 8, 1945 |
| 2,419,143 | Kehle | Apr. 15, 1947 |
| 2,614,573 | Jacobsson | Oct. 21, 1952 |

FOREIGN PATENTS

| 898,888 | France | July 17, 1944 |
| 506,673 | Belgium | Nov. 14, 1951 |
| 693,244 | Great Britain | June 24, 1953 |